United States Patent
Sato

(10) Patent No.: US 6,788,659 B1
(45) Date of Patent: Sep. 7, 2004

(54) TRANSMISSION CONTROL WITHOUT LIMITATION OF THE NUMBER OF USERS

(75) Inventor: Takeshi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/476,137

(22) Filed: Jan. 3, 2000

(30) Foreign Application Priority Data

Jan. 4, 1999 (JP) ............................................. 11-000144

(51) Int. Cl.$^7$ .............................................. H04Q 7/00
(52) U.S. Cl. .................. 370/329; 370/341; 370/342; 370/441; 370/335; 370/431; 455/450; 455/509
(58) Field of Search ................................ 370/329, 328, 370/338, 320, 335, 441, 437, 479, 431, 330, 331, 334, 341, 342, 343, 345, 337, 348; 455/464, 509, 517, 450, 452.1, 451, 512, 453, 516, 527

(56) References Cited

U.S. PATENT DOCUMENTS

| | | | | |
|---|---|---|---|---|
| 5,477,542 A | | 12/1995 | Takahara et al. ............ 370/94.1 |
| 5,513,379 A | * | 4/1996 | Benveniste et al. ......... 455/451 |
| 5,721,762 A | * | 2/1998 | Sood .......................... 455/466 |
| 5,722,043 A | * | 2/1998 | Rappaport et al. ....... 455/452.1 |
| 5,752,193 A | * | 5/1998 | Scholefield et al. ..... 455/452.2 |
| 5,809,423 A | * | 9/1998 | Benveniste et al. ......... 455/464 |
| 6,014,556 A | * | 1/2000 | Bhatia et al. ............ 455/404.1 |
| 6,157,627 A | * | 12/2000 | Olofsson et al. ............ 370/329 |
| 6,230,016 B1 | * | 5/2001 | Benveniste .................. 455/450 |
| 6,393,000 B1 | * | 5/2002 | Feldman ..................... 370/316 |
| 6,496,490 B1 | * | 12/2002 | Andrews et al. ............ 370/329 |
| 6,707,804 B2 | * | 3/2004 | Proctor, Jr. ................. 370/335 |

FOREIGN PATENT DOCUMENTS

| | | |
|---|---|---|
| JP | 63-56040 | 3/1988 |
| JP | 5-252101 | 9/1993 |
| JP | 7-59161 | 3/1995 |
| JP | 9-270767 | 10/1997 |
| JP | 10-28098 | 1/1998 |
| JP | 10-32579 | 2/1998 |
| JP | 10-112698 | 4/1998 |
| JP | 10-190621 | 7/1998 |
| JP | 10-322312 | 12/1998 |
| JP | 11-55727 | 2/1999 |
| JP | 2000-78651 | 3/2000 |
| JP | 2000-106690 | 4/2000 |

* cited by examiner

*Primary Examiner*—Wellington Chin
*Assistant Examiner*—Chuong Ho
(74) *Attorney, Agent, or Firm*—Whitham, Curtis & Christofferson, P.C.

(57) ABSTRACT

A packet transmission control method is achieved by borrowing a first one of a plurality of channels for a first one of a plurality of existing users in response to a packet receiving request, and by transmitting packets to a new user using the first channel.

17 Claims, 7 Drawing Sheets

TRANSMISSION CONTROL WITHOUT LIMITATION OF THE NUMBER OF USERS

BACKGROUND OF THE INVENTION

1. Field of the Invention

The present invention relates to transmission control, and more particularly to a packet transmission control method and a packet transmission system for the same.

2. Description of the Related Art

At present, a W-CDMA system has been developed. The W-CDMA system is applied with a circuit switching system in which a channel or a spreading code is once secured by a voice signal user and continues to be possessed by the voice signal user, until the communication of a voice signal ends. The W-CDMA system can handle a data packet in addition to the voice signal such that the W-CDMA can cope with the Internet. In this way, the W-CDMA system is assumed as the system in which the circuit switching system and the data packet coexists. The structure of a transmitter of a downlink in the W-CDMA system is disclosed in "Effects of Orthogonal Spreading and Rake Combining on DS-CDMA Forward Link in Mobile radio" by Fumiyuki Adachi (IEICE Transactions on Communication Vol. E80-B, No. 11, November 1997).

FIG. 1 shows the transmission situation of signals in the downlink when the transmitter is used. All the signals are transmitted in parallel. D1, D2, . . . , D5 indicate data packet signal users and V1, V2, . . . , V4 show voice signal users, respectively. There are the following problems in this well known technique.

The first problem is in that the channel capacity of the down link is determined based on the number of existing spreading codes, and users who exceed the number of the spreading codes can not be permissible regardless of whether the users are voice signal user or packet signal users. The reason is that either of the voice signal user and the packet signal user must use a spreading code as an accessing user. In this way, the number of users who can use the system is actually limited to the number of spreading codes.

The second problem is that actual traffic quantity is less than the number of accessing users so that the capacity of the system is not sufficiently used. FIG. 1 shows an example of the voice signal users accessing at the same time and the traffic situation which actually occurs. The reason is that the channels are limited based not on the actual traffic quantity but on the number of accessing users, as seen from FIG. 1. In this way, the number of users who can actually use the system is limited based on the number of channels which is limited based on the system itself.

In conjunction with the above description, a communication resource allocation is described in Japanese Laid Open Patent Application (JP-A-Heisei 5-252101 corresponding to U.S. application filed on Nov. 1, 1991). In this reference, an allocating unit includes a unit for distinguishing a subscriber with the highest priority from among conflicting subscribers in a radio communication network. A usable communication resource is allocated to the distinguished subscriber in a short time with no relation to a traffic quantity without collision.

Also, a radio ATM-LAN transmission system is described in Japanese Laid Open Patent Application (JP-A-Heisei 10-32579). In this reference, a radio base station functions as a parent station with first and second units. The first unit manages resources in its service area using combinations of a spreading code and a chip rate in CDMA. The second unit allocates the resources based on the combination of a spreading code and a chip rate in accordance with a service request from a radio terminal in the service area or an ATM terminal on the side of ATM-LAN. The radio terminal receives a plurality of spreading codes and a plurality of chip rates from the parent station, and sets a spreading code and a chip rate to change a transmission rate to an optimal value.

Also, a spread spectrum communication apparatus is described in Japanese Laid Open Patent Application (JP-A-Heisei 9-270767). In this reference, a primary modulating section (3, 4) multiplies a digital information signal from an input section (1, 2) with a carrier signal such as a sine wave to produce a narrow band signal. A secondary modulating section (5) multiplies the narrow band signal of a picture with a spreading code (a) to produce a spread signal (7). A secondary modulating section (6) multiplies the narrow band signal of a sound with a spreading code (b) to produce a spread signal (8). An adder adds the spread signal (7) and the spread signal (8). The spread spectrum communication apparatus further includes a transmission section (10), a transmission antenna (11) and a reception antenna (21). Also, a receiving section (22) produces a code multiple signal (24). A distributor (23) distributes the code multiple signal into two. A primary demodulating section (25) multiplies the spreading code a with the code multiple signal (24). A secondary demodulating section (26) multiplies the spreading code b with the code multiple signal (24). The spread spectrum communication apparatus further includes a second demodulating section (27, 28) and an output section (29, 30).

Also, a radio resource control method is described in Japanese Laid Open Patent Application (JP-A-Heisei 10-190621). In this reference, physical radio resources are divided into continuous frames in a time direction. The frame includes slots (16, 17, and 18) with various sizes. The slot indicates a predetermined allocation ratio of the physical radio resources contained in each frame, and can be individually allocated to different radio connections. The first dimension of the frame is a time and the second dimension of the frame is time, frequency or code. The slot indicates various sizes in the second dimension direction. A first predetermined integer of the first size slot can be exchanged in a modular with another integer of the slot with another size.

Also, a radio communication apparatus is described in Japanese Laid Open Patent Application (JP-A-Heisei 10-112698 corresponding to U.S. application filed on Sep. 27, 1996). In this reference, a reduced gain spread spectrum communication system (6) includes transceivers (8) connected to a base station (10). Also, a spreading unit (28) is contained to spread a digital packet (26) indicative of sound using a spreading sequence length shorter than a spreading gain available to a predetermined transmission band. The spreading unit (28) can spread a digital packet indicative of a data using a spreading sequence length longer than the spreading sequence length for the sound.

SUMMARY OF THE INVENTION

Therefore, an object of the present invention is to provide a transmission system in which the number of users is not limited based on the number of spreading codes, and a transmission control method for the same.

Another object of the present invention is to provide a transmission system in which the number of users is not limited based on the number of channels, and a transmission control method for the same.

In an aspect of the present invention, a packet transmission control method is achieved by borrowing a first channel of a plurality of channels from a first one of a plurality of existing users in response to a packet receiving request, and by transmitting packets to a new user using the first channel.

Here, in the borrowing, a receiving operation by the first existing user may be stopped in response to the packet receiving request from the new user.

Also, in the borrowing, a spreading code may be allocated to the new user in response to the packet receiving request from the new user. At this time, in the transmitting, the packets is transmitted to the new user using the first channel and the allocated spreading code.

It is preferable that the first channel is a voice channel. In this case, in the borrowing, the first channel may be monitored in response to a monitor request generated in response to the packet receiving request, and a receiving operation by the first existing user is stopped when a voiceless portion of the first channel is detected. Also, in the transmitting, a receiving operation by the new user may be stopped when a voice portion of the first channel is detected after the voiceless portion of the first channel is detected. In addition, the receiving operation by the first existing user is restarted when the voice portion of the first channel is detected after the voiceless portion of the first channel is detected. In addition, in the borrowing, a spreading code which is allocated to the first existing user may be allocated to the new user in response to the packet receiving request from the new user.

Alternatively, it is preferable that the first channel is a data channel. In this case, in the borrowing, a time slot and a spreading code which is allocated to the first existing user may be allocated to the new user in response to the packet receiving request from the new user. Also, in the transmitting, packets to the first existing user are delayed while the packets are transmitted to the new user using the allocated time slot and the allocated spreading code.

Also, in the packet transmission control method, another channel is borrowed for another existing users, when the channel is used for the existing user, and other packets are transmitted to the new user using the other channel.

In order to achieve another aspect of the present invention, a packet transmission control apparatus, includes a control unit and a base station. The control unit monitors a transmission situation to an existing user via a channel in response to a monitor request, and controls a new user to receive packets. The base station outputs the monitor request to the control unit in response to the packet receiving request from the new user, and transmits the packets to the new user in response to the control to the new user by the control unit.

When the first channel is a voice channel, the control unit may control the existing user to stop a receiving operation when the control unit detects a voiceless portion of the channel, and the base station to transmit the packets to the new user. Also, the control unit may control the existing user to restart the receiving operation when the control unit detects a voice portion of the channel, and the base station to stop the transmission of the packets to the new user. In addition, the base station preferably allocates a spreading code to the new user in response to the packet receiving request.

Alternatively, when the channel is a data channel, the base station may allocate a spreading code and a time slot to the new user in response to the packet receiving request. In this case, the base station includes a buffer in which the packets are buffered. Also, the control unit may control the base station to transmit the packets to the new user using the time slot based on a storage situation of the packets in the buffer. In addition, the control unit preferably monitor a transmission situation to another existing user via another channel in response to the monitor request, and controls the new user to receive the packets. The base station transmits the packets to the new user in response to the control to the new user by the control unit.

DESCRIPTION OF THE PREFERRED EMBODIMENTS

Hereinafter, a W-CDMA transmission control system of the present invention will be described below in detail with reference to the attached drawings.

Figure 1:
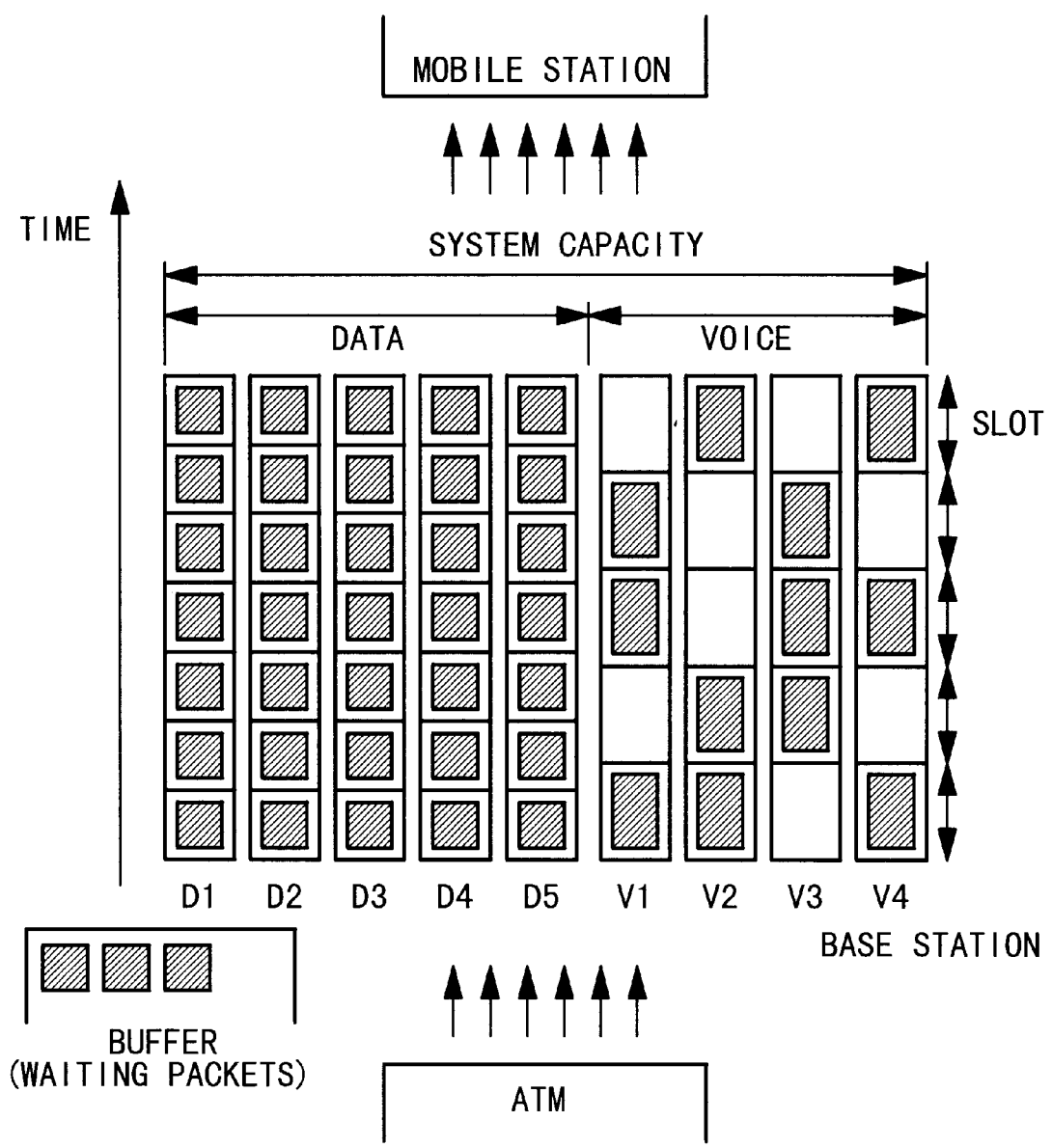
FIG. 1 is a diagram showing channels of a conventional transmission control system.
Figure 2:
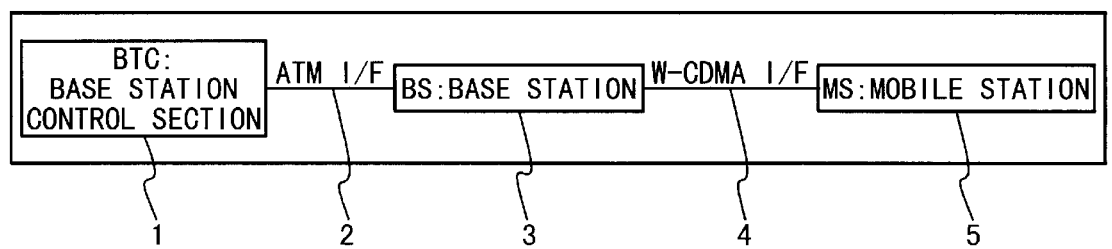
FIG. 2 is a system block diagram showing the structure of a transmission control system according to a first embodiment of the present invention.

Referring to FIG. 2, the W-CDMA transmission control system is composed of a base station control section (BTC) 1, an ATM interface section 2, a base station (BS) 3, a W-CDMA interface section 4 and a mobile station (MS) 5.

The base station control section 1 receives a signal from the network and sends a signal to the base station 3. The base station 3 sends the signal to the mobile station 5 through the W-CDMA interface section 4. In the W-CDMA interface section 4, the received signal is distinguished using a spreading signal which is peculiar to the user.

Figure 3:
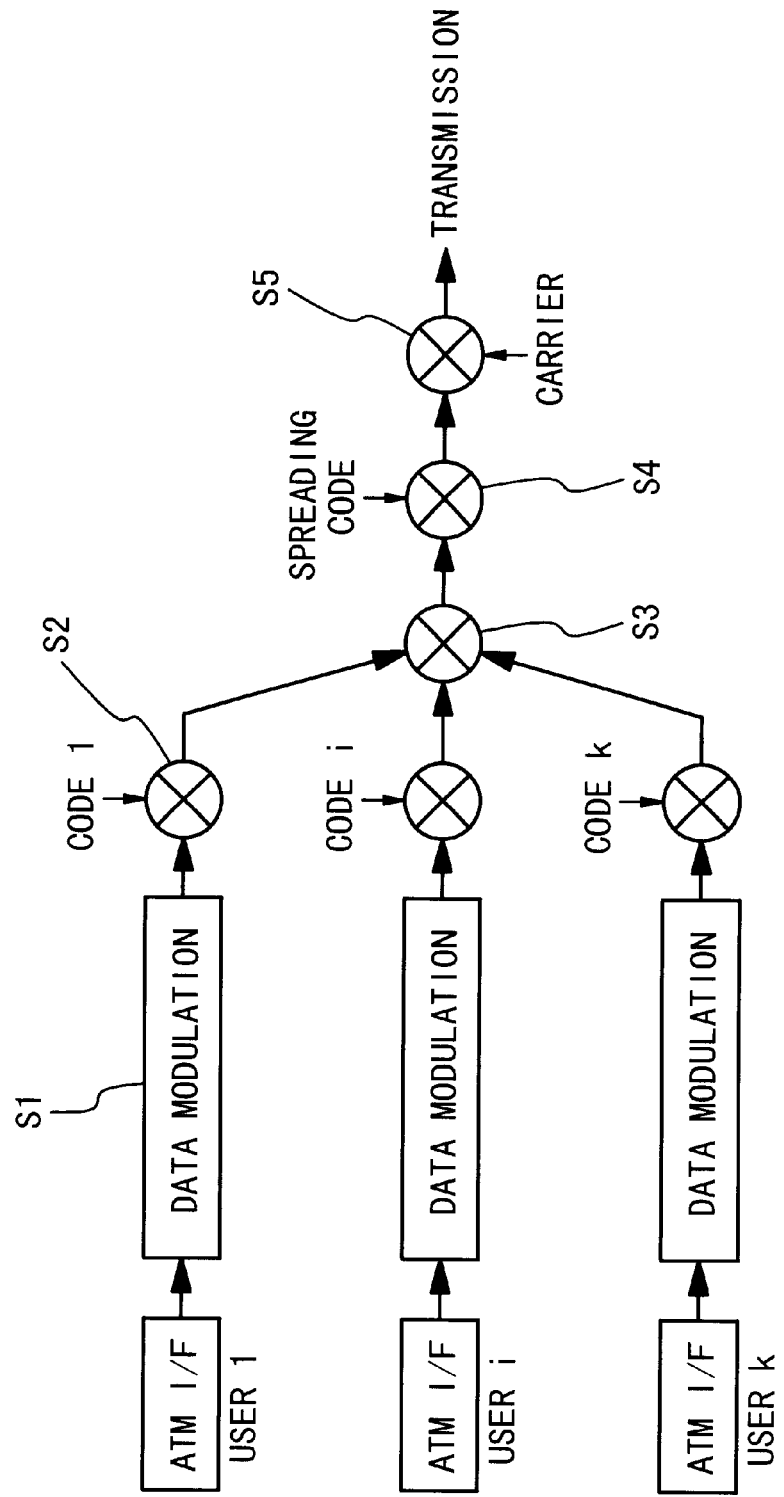
FIG. 3 is a block diagram showing a signal circuit used in the transmission control system according to the first embodiment of the present invention.

As shown in FIG. 3, in the base station 3, the signal of a user USER1 which arrives through the ATM interface section 2 is primarily modulated (Step S1). Moreover, the spreading code is multiplied such that the primarily modulated signal is converted into secondarily modulated signal (Step S2). After the secondarily modulated signal is added to the signals of the other users USERi and USERk which are modulated in the same way (Step S3). Then, a spreading code is multiplied (Step S4). Thereafter, a carrier is multiplied and is sent out (Step S5). In this way, the signals of all users USER1, USERi and USEk are transmitted in parallel.

Figure 4:
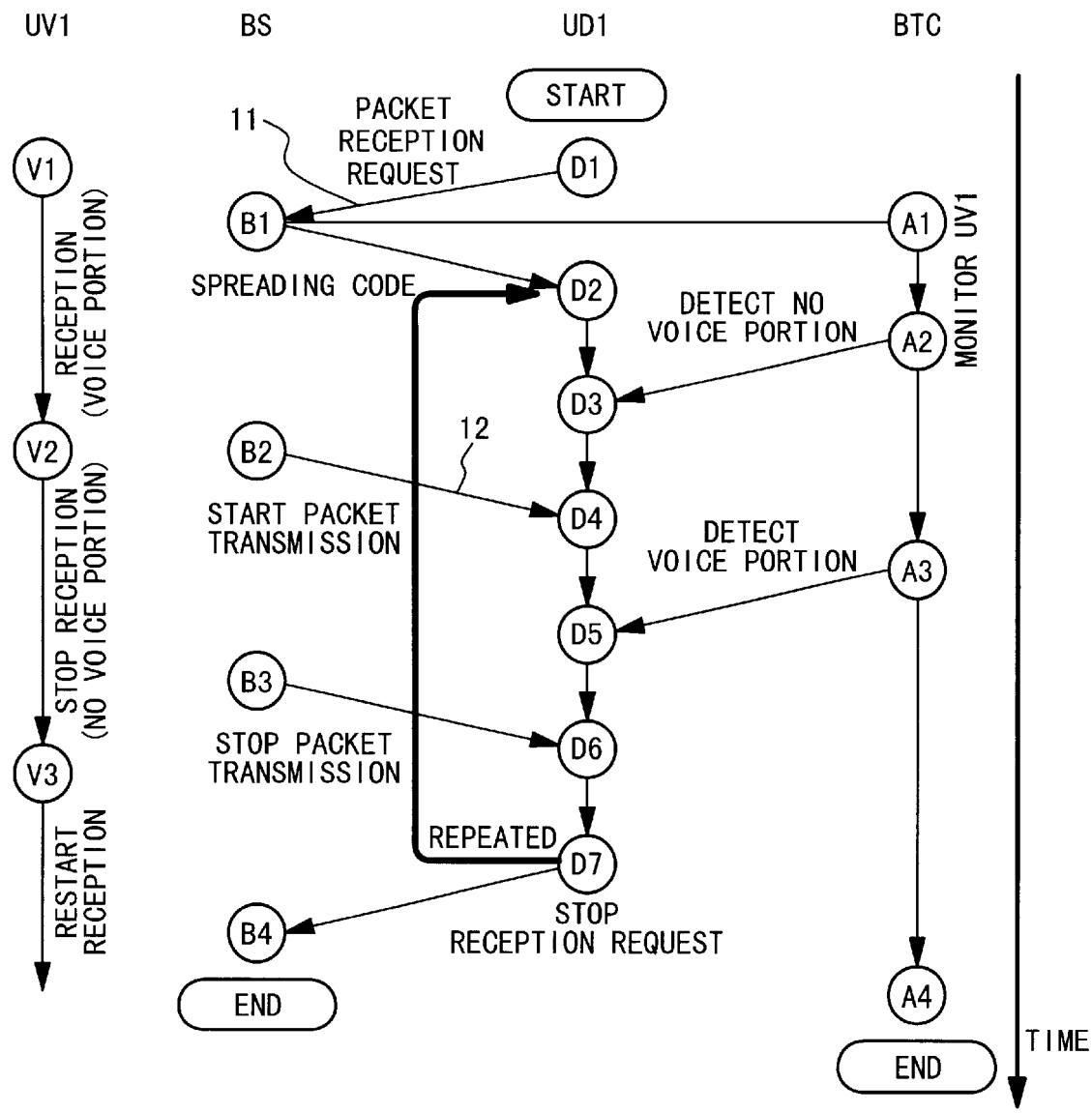
FIG. 4 is a sequence diagram showing an operation of the transmission control system according to the first embodiment of the present invention.

FIG. 4 shows the process of the transmission control method according to the first embodiment of the present invention as the time sequence. It is supposed that a data packet signal user UD1 as a mobile station is generated newly. If there is a spreading code which is not used at the time of the generation, communication is carried out using the spreading code. All spreading codes are supposed to be already used. At this time, the data packet signal user UD1 borrows the channel of an already existing voice signal user UV1, e.g., the spreading code of the voice signal user UV1.

The data packet signal user UD1 sends out a packet reception request 11 to the base station BS 3 mentioned above (Step D1). The base station BS 3 determines whether all the spreading codes are already used. When all the spreading codes are already used, the base station BS 3 determines the voice signal user UV1 who can lend the spreading code in consideration of the statistical nature of the already existing voice signal users. Then, the base station allocates the spreading code of the voice signal user UV1 to the data packet signal user UD1 (Step B1). The data packet signal user UD1 who has received the spreading code enters the waiting state (Step D2). The base station BS 3 sends a monitor request to the base station control section BTC 1 in response to the reception request from the data signal use UD1 (step A1). The base station control section BTC 1 starts to monitor a voice signal of the voice signal user UV1 in response to the monitor request from the base station BS3.

It is supposed that a voiceless portion of the voice signal to the voice signal user UV1 is detected by the base station control section BTC 1 (Step A2). The detection of the voiceless portion is informed to the data packet signal user UD1 via the base station BS 3, and the data packet signal user UD1 enter the reception preparation state (Step D3).

At substantially the same time when the data packet signal user UD1 enters the state of the reception preparation, the packets 12 are sent from the base station BS 3 to the data packet signal user UD1 (Step B2). The data packet signal user UD1 starts the reception of the packets 12 (Step D4). At the same time, the voice signal user UV1 is controlled by the base station control section BTC 1 via the base station BS 3 to stop the reception from the time when the reception by the data packet signal user UD1 is started (Step V2). However, the data packet signal user UD1 continues the reception.

When detecting the voice portion of the voice signal, the base station control section BTC 1 informs the detection of the voice portion to the data packet signal use UD1 via the base station BS 3 (Step A3, step D5). The base station BS stops the transmission of the data packets 12 in response to the information. The data packet signal user UD1 also stops the reception of the data packet at the same time (step D6) and enters the wait state again. The voice signal user UV1 restarts the reception of the voice signal in response to the information (Step V3). The base station control section BTC 1 continues to monitor the voice signal of the voice signal user UV1 and looks for a voiceless portion. This process is continued until the data packet signal user UD1 generates a packet reception end request to the base station BS 3 (Step D7). The base station control section BTC 1 stops the monitoring operation in the packet reception end request via the base station BS 3 (Step A4).

In the first embodiment, the data packet of the other user is sent out using the channel or spreading code of the voice signal user. In this case, using the spreading code of the other data packet signal user, the data packet may be sent out as follows. In the first embodiment, when a new data packet signal user is generated, the user is permissible. However, the data packet signal user who has already started communication using the spreading code can cope with the change of a transmission rate by lending the spreading code to the other user. Also, although a spreading code is borrowed from one user in the first embodiment, spreading codes may be borrowed from the plurality of users. In this case, the above-described operation is carried out for each of the spreading codes.

Figure 5:
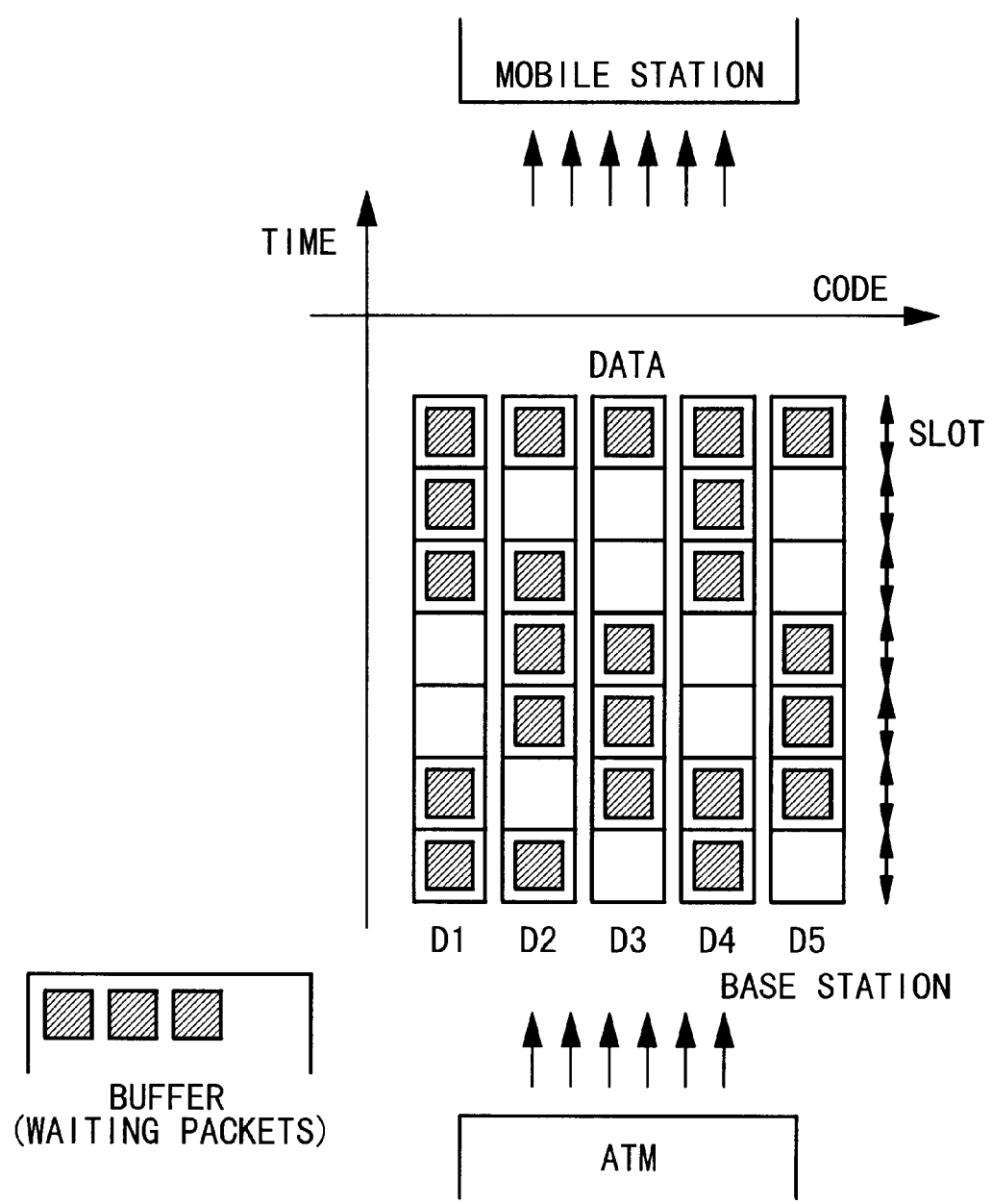
FIG. 5 is a diagram showing an empty portion of the data packet.

FIG. 5 shows the transmission system according to the second embodiment of the present invention. In the second embodiment, the voice signal user is not considered. A case where only the packet signal users exist is supposed, as shown in FIG. 5. Generally, the arrival of the packet is not continuous but is intermittent. The empty period sometimes exists between a packet and another packet which will arrive next. Therefore, the not used slots exists as shown in FIG. 5 by the blank sections. Such a slot is the slot which the other user can use.

It is possible that the base station control section BTC 1 monitors the arrival situation of the packets and the storage situation of the arrived packets in a buffer. When a packet arrival is detected, the detection is informed to each user every time of the detection. However, the packet is different from the voice signal, and can permit the delay to some extent to wait the packet. In the transmission control system in the second embodiment, a spreading code and a slot time to be borrowed are previously informed to another user.

Figure 6:
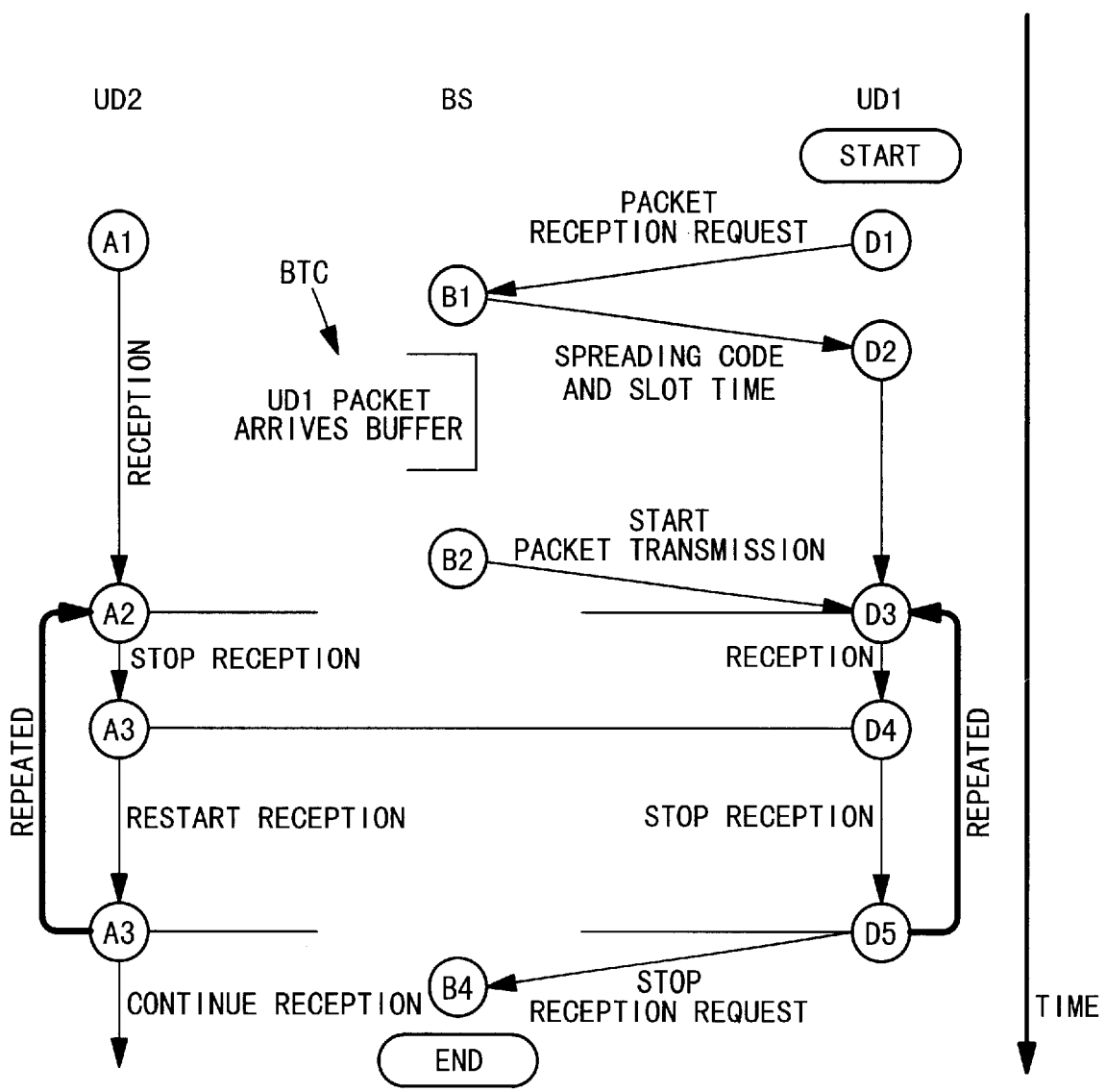
FIG. 6 is a sequence diagram showing an operation of the transmission control system according to a second embodiment of the present invention.

As shown in FIG. 6, a new packet signal user UD1 sends out a packet reception request to the base station BS 3 at a step D1. The base station BS 3 determines an existing packet signal user UD2 having the spreading code to be lent to the data packet signal user UD1, based on the monitoring result by the base station control section BTC 1. The base station BS 3 notifies the new packet signal user UD1 and the existing packet signal user UD2 of the spreading code and the time that a packet is to be transmitted to the data packet signal user UD1. Meanwhile, the packet for the new packet signal user UD1 arrives at the base station BS 1. All the packets arriving in this way are stored in a buffer (Step B1 to B2).

At the step B2, the base station BS 3 starts the transmission of the packets which have been stored in the buffer for the new packet signal user UD1. Meanwhile, the existing packet signal user UD2 is controlled by the base station control section BTC 1 via the base station BS 3 to stop the reception (Step A2 to A3). That is, the existing packet signal user UD2 lends the slot to the new packet signal user UD1. In this way, the transmission control system in the second embodiment includes the lending of a spreading code and the lending of the time slot.

The new packet signal user UD1 receives the packets using the predetermined number of slots. A packet reception stop request is sent from the new packet signal user UD1 to the base station control section BTC 1 via the base station BS 3 at a step D5. Thus, the service to the new packet signal user UD1 is ended. After that, the existing packet signal user UD2 returns to the normal receiving state at the step A3.

Figure 7A:
FIGS. 7A to 7D are time charts showing the use of the data packets.
Figure 7B:
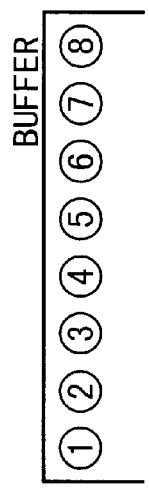

FIGS. 7A to 7D show actual channel situations. 12 packets to the existing packet signal user UD2 are supposed to have arrived or to be on the time slots, as shown in FIG. 7A. The portion where any number is not shown is the slot in which a packet is not present. On the other hand, as shown in FIG. 7B, eight packets to the new user UD1 have arrived in the buffer.

Figure 7C:
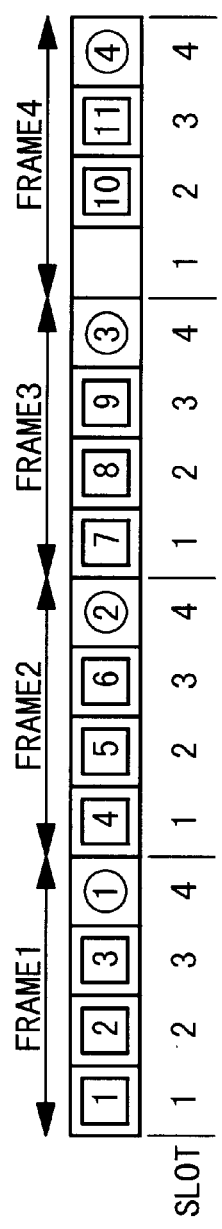
Figure 7D:
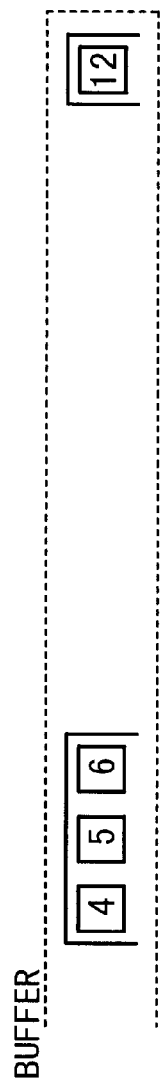

It is supposed that one frame is composed of four slots and that the fourth slot is lent to the new packet signal user UD1. Which of slots should be lent is predetermined by the base station control unit BTC 1 and is recognized by the new packet signal user UD1 and the existing packet signal user UD2. At this time, each packet is mapped, as shown in FIG. 7C. That is, the packets 1 to 3 to the existing packet signal user UD2 are contained in the first to third slots of the first frame. The packet 1 to the new packet signal user UD1 is contained in the fourth slot. At this time, the packet 4 to the existing packet signal user UD2 is made to be waited in the buffer, as shown in FIG. 7D. The packet 4 is contained in the slot 1 of the second frame. Likewise, the packets 5 and 6 are made to be waited in the buffer, as shown in FIG. 7D.

After all, the packets 4, 5 and 6 are made to be waited in the buffer by one slot. The packets 4, 5 and 6 to the existing packet signal user UD2 are set in three slots of the second frame. The packet 2 to the new packet signal user UD1 is set in the fourth slot of the second frame. The packets to both of the existing packet signal user UD2 and the new packet signal user UD1 are contained in the third and fourth frames in the same way. However, when the packet to the existing packet signal user UD2 is not supplied as shown in FIG. 7A, the first slot is empty.

In this way, four empty slots shown in FIG. 7A are decreased to one as shown in FIG. 7C. Instead, the packet 12 to the existing packet signal user UD2 is stored in the buffer. Therefore, the packets to the existing packet signal user UD2 are delayed and the packets to the new packet signal user UD1 are transmitted during the waiting state of the existing packet signal user UD2. When the base station control section BTC 1 determines that the number of packets to the existing packet signal user UD2 which are stored in the buffer exceeds a permissible value, the service to the new packet signal user UD1 may be stopped or the channel or the spreading code of the other user may be borrowed.

In such a way, the transmission rate of the new packet signal user UD1 has become very small. However, a plurality of spreading codes may be previously borrowed to carry out multi-code transmission. Thus, the transmission rate can be improved. In the third embodiment shown in FIGS. 7A to 7D, while the arrival of the packets is random or in a burst, the present invention has the effect in which the use of the slots is made uniform by sending out the packets to the other user which are waited in the buffer.

The transmission control method of the present invention has the effects as follows. That is, the first effect is in that the wastefulness of the channel for the voiceless portion of the voice signal can be decreased. The reason is that the packets relatively easy to random access are sent out in the voiceless portions of the voice signal.

The second effect is in that the request of further data packet can be accepted even if all the channels or spreading codes are supposed to have been occupied. The reason is that the spreading code used by the other user is borrowed.

The third effect is in that it is possible to decrease the delay taken to receive the packets. The reason is that the system of the present invention can process the packets to be waited in the buffer, and can accommodate one user packets into other's channel.

What is claimed is:

1. A packet transmission control method, comprising:
    borrowing a first channel of a plurality of channels from one of a plurality of existing users in response to a packet receiving request and in response to detection of an empty period in use by said existing user of said first channel;
    transmitting packets to a new user using said first channel; and
    transmitting packets to said one of said plurality of existing users using said first channel, wherein the first channel is allocated to a base station serving said one of said plurality of existing users and the new user.

2. A packet transmission control method according to claim 1, wherein said borrowing includes:
    stopping a receiving operation by said one of said plurality of existing users in response to said packet receiving request from said new user.

3. A packet transmission control method according to claim 1, wherein said borrowing includes:
    allocating a spreading code to said new user in response to said packet receiving request from said new user, and
    wherein said transmitting includes:
    transmitting the packets to said new user using said first channel and said allocated spreading code.

4. A packet transmission control method according to claim 1, wherein said first channel is a voice channel and said empty period is a voiceless portion of a voice signal in said voice channel.

5. A packet transmission control method according to claim 4, wherein said borrowing includes:
    monitoring said first channel in response to a monitor request generated in response to said packet receiving request; and
    stopping a receiving operation by said one of said plurality of existing users when a voiceless portion of said first channel is detected.

6. A packet transmission control method according to claim 5, wherein said transmitting includes:
    stopping a receiving operation by said new user when a voice portion of said first channel is detected after the voiceless portion of said first channel is detected; and
    restarting the receiving operation by said one of said plurality of existing users when the voice portion of said first channel is detected after the voiceless portion of said first channel is detected.

7. A packet transmission control method according to claim 4, wherein said borrowing includes:
    allocating to said new user, a spreading code which is allocated to said one of said plurality of existing users, in response to said packet receiving request from said new user.

8. A packet transmission control method according to claim 1, wherein said first channel is a data channel and said empty period is between a packet and another packet which will arrive next.

9. A packet transmission control method according to claim 8, wherein said borrowing includes:
    allocating to said new user, a time slot and a spreading code which is allocated to said one of said plurality of existing users, in response to said packet receiving request from said new user, and so that a frame is shared between the one of the plurality of existing users and the new user.

10. A packet transmission control method according to claim 9, wherein said transmitting includes:
    storing packets to said said one of said plurality of existing users while the packets are transmitted to said new user using said allocated time slot and said allocated spreading code.

11. A packet transmission control method according to claim 1, further comprising:
    borrowing another channel from another of said plurality of existing users, when said first channel is used for said one of said of said plurality of existing users; and
    transmitting other packets to said new user using said other channel.

12. A packet transmission control apparatus, comprising:
    a control unit monitoring a transmission situation to an existing user via a channel in response to a monitor request, and controlling a new user to receive packets; and
    a base station outputting said monitor request to said control unit in response to said packet receiving request from said new user, and transmitting the packets to said new user in response to the control of said new user by said control unit;

wherein said channel is a voice channel, and wherein said control unit controls said existing user to stop a receiving operation when said control unit detects a voiceless portion of said channel, and controls said base station to transmit the packets to said new user.

13. A packet transmission control apparatus according to claim 12, wherein said control unit controls said existing user to restart the receiving operation when said control unit detects a voice portion of said channel, and said base station to stop the transmission of the packets to said new user.

14. A packet transmission control apparatus according to claim 12, wherein said base station allocates a spreading code to said new user in response to said packet receiving request.

15. A packet transmission control apparatus, comprising:

a control unit monitoring a transmission situation to an existing user via a channel in response to a monitor request, and controlling a new user to receive packets; and a base station outputting said monitor request to said control unit in response to said packet receiving request from said new user, and transmitting the packets to said new user in response to the control of said new user by said control unit;

wherein said channel is a data channel, and wherein said base station allocates a spreading code and a time slot of a frame to said new user in response to said packet receiving request and in response to detection of an empty period in use by said existing user of said data channel.

16. A packet transmission control apparatus according to claim 15, wherein said base station includes a buffer in which the packets are buffered, and wherein said control unit controls said base station to transmit the packets to said new user using said time slot based on a storage situation of the packets in said buffer.

17. A packet transmission control apparatus according to claim 12, wherein said control unit monitors a transmission situation to another existing user via another channel in response to said monitor request, and controls said new user to receive the packets and said base station transmits the packets to said new user in response to the control to said new user by said control unit.

\* \* \* \* \*